United States Patent
Yang et al.

(10) Patent No.: US 8,393,221 B2
(45) Date of Patent: Mar. 12, 2013

(54) BALL PRESSURE GAUGE

(75) Inventors: Wei-Chao Yang, Taipei (TW); Chin-Chu Huang, Taipei (TW); Sy-Tyng Hwang, Taipei (TW)

(73) Assignee: Continental Chemical Industries Co., Ltd., Taipei (TW)

( * ) Notice: Subject to any disclaimer, the term of this patent is extended or adjusted under 35 U.S.C. 154(b) by 176 days.

(21) Appl. No.: 13/068,479

(22) Filed: May 12, 2011

(65) Prior Publication Data
US 2012/0285252 A1 Nov. 15, 2012

(51) Int. Cl.
*G01L 19/16* (2006.01)
(52) U.S. Cl. .......................................... 73/700; 137/227
(58) Field of Classification Search .................... 73/700; 137/227
See application file for complete search history.

(56) References Cited

U.S. PATENT DOCUMENTS

| | | | | |
|---|---|---|---|---|
| 1,807,752 A | * | 6/1931 | Poster | 73/146.8 |
| 3,595,083 A | * | 7/1971 | Dassler | 73/714 |
| 4,193,295 A | * | 3/1980 | Curran | 73/146.8 |
| 4,829,829 A | * | 5/1989 | Ferris | 73/744 |
| 5,148,712 A | * | 9/1992 | Cross et al. | 73/756 |
| 7,225,677 B2 | * | 6/2007 | Huang | 73/700 |
| 7,458,270 B2 | * | 12/2008 | Kiefer et al. | 73/718 |

FOREIGN PATENT DOCUMENTS
GB 2190750 A * 11/1987

* cited by examiner

*Primary Examiner* — Lisa Caputo
*Assistant Examiner* — Punam Roy
(74) *Attorney, Agent, or Firm* — Charles E. Baxley

(57) ABSTRACT

A ball pressure gauge for measuring magnitude of an air pressure in an inflatable ball includes: a probe being configured to pierce into the ball; an air-pressure indicator being configured to move according to the magnitude of the air pressure; a gauge body being provided with a set of air-pressure scale for the air-pressure indicator to point and indicate the magnitude of the air pressure as a numeral value; and at least one ball-specific recommended pressure dial being set alongside the air-pressure scale and including segments representing ranges of applicable air pressures for different types of balls. Thereby, the ball pressure gauge informs a user rapidly and directly of ball-specific appropriateness of the measured air pressure, so that the user can instantly adjust the air pressure to optimization.

6 Claims, 7 Drawing Sheets

BALL PRESSURE GAUGE

BACKGROUND OF THE INVENTION

1. Technical Field

The present invention relates to air pressure measuring devices for inflatable balls, and more particularly, to a ball pressure gauge whose gauge body includes a ball-specific recommended pressure dial that provides recommended pressure ranges for various types of balls, thereby facilitating adjustment of the air pressure for a ball being measured.

2. Description of Related Art

As shown in FIG. 1, a conventional ball pressure gauge 1 primarily has a probe 2 to be inserted into an inflated and to-be-measured ball through an air valve of the ball, so that the ball pressure gauge 1 is allowed to measure the air pressure inside the ball; an air-pressure indicator 3 moving according to magnitude of a air pressure measured; and a gauge body 4 having a set of air-pressure scale to be pointed by the arm-like air-pressure indicator 3 for showing the numeral value of the air pressure inside the ball measured by the ball pressure gauge 1.

It is known that different types of balls, such as volleyballs, basketballs and soccer balls, each have a specific pressure range to provide hardness and rebound optimal to the sport it was designed for. Thus, inflation for a ball is preferably conducted according to its ball-specific applicable pressure range rather than making the ball fully (sometimes also excessively) inflated. A ball over or insufficiently inflated is unfavorable to exercise with.

However, the conventional ball pressure gauge 1 comprises only the numeral scale in the gauge body 4, so a user has to memory the applicable pressure ranges for different balls in mind. Sometimes, the ball pressure gauge 1 may be sold with a hangtag 5, as shown in FIG. 2, or other packaging materials carrying a table 6 showing the applicable air pressure ranges for different balls. Nevertheless, such a hangtag 5 or packaging material may be likely lost after the user unpacks the ball pressure gauge 1, and in this case the user will have difficulty in determining appropriateness of inflation for a ball.

SUMMARY OF THE INVENTION

In view of this, the present invention provides a ball pressure gauge, which has a gauge body including an air-pressure scale coming along with a ball-specific recommended pressure dial for informing its user of the appropriateness of inflation for different types of balls.

In the present invention, a ball pressure gauge for measuring magnitude of an air pressure in an inflatable ball includes: a probe being configured to pierce into the ball; an air-pressure indicator being configured to move according to the magnitude of the air pressure; a gauge body being provided with a set of air-pressure scale for the air-pressure indicator to point and indicate the magnitude of the air pressure as a numeral value; and at least one ball-specific recommended pressure dial being set alongside the air-pressure scale and including segments representing ranges of applicable air pressures for different types of balls.

The objective of the present invention is to allow a user to be rapidly and directly informed of ball-specific appropriateness of the measured air pressure by the ball-specific recommended pressure dial alongside the air-pressure scale in the gauge body, so that the user can instantly adjust the air pressure for ball-specific appropriateness. Thereby, the users need no more to memory the applicable pressure ranges for different balls in mind. Meantime, with the unique ball-specific recommended pressure dial of the present invention, users no more need to carefully keep packaging materials or hangtags coming along with a new ball pressure gauge that state ball-specific applicable air pressure ranges and tend to be lost after the user unpacks the ball pressure gauge.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawings, wherein.

DETAILED DESCRIPTION OF THE INVENTION

While the present invention is described in light of its spirit with particular embodiments, the accompanying drawings depicting the embodiments are made for clear illustration and are might not be made to scale.

Figure 1:
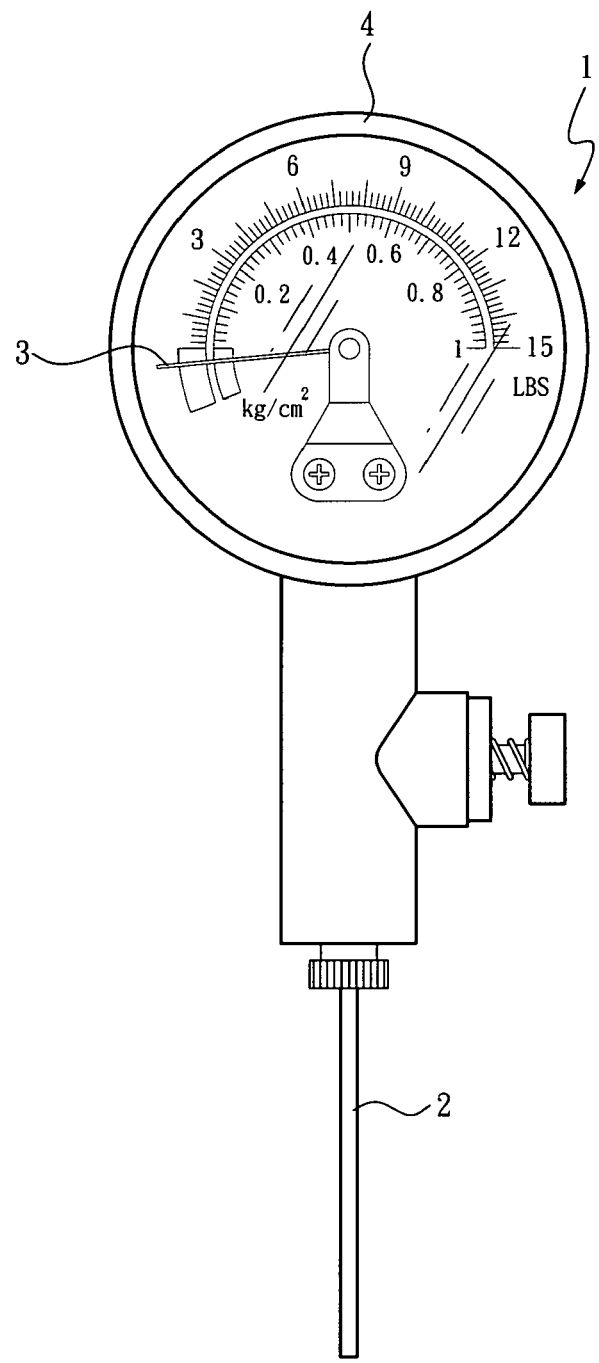
FIG. 1 is a front view of a conventional ball pressure gauge.
Figure 2:
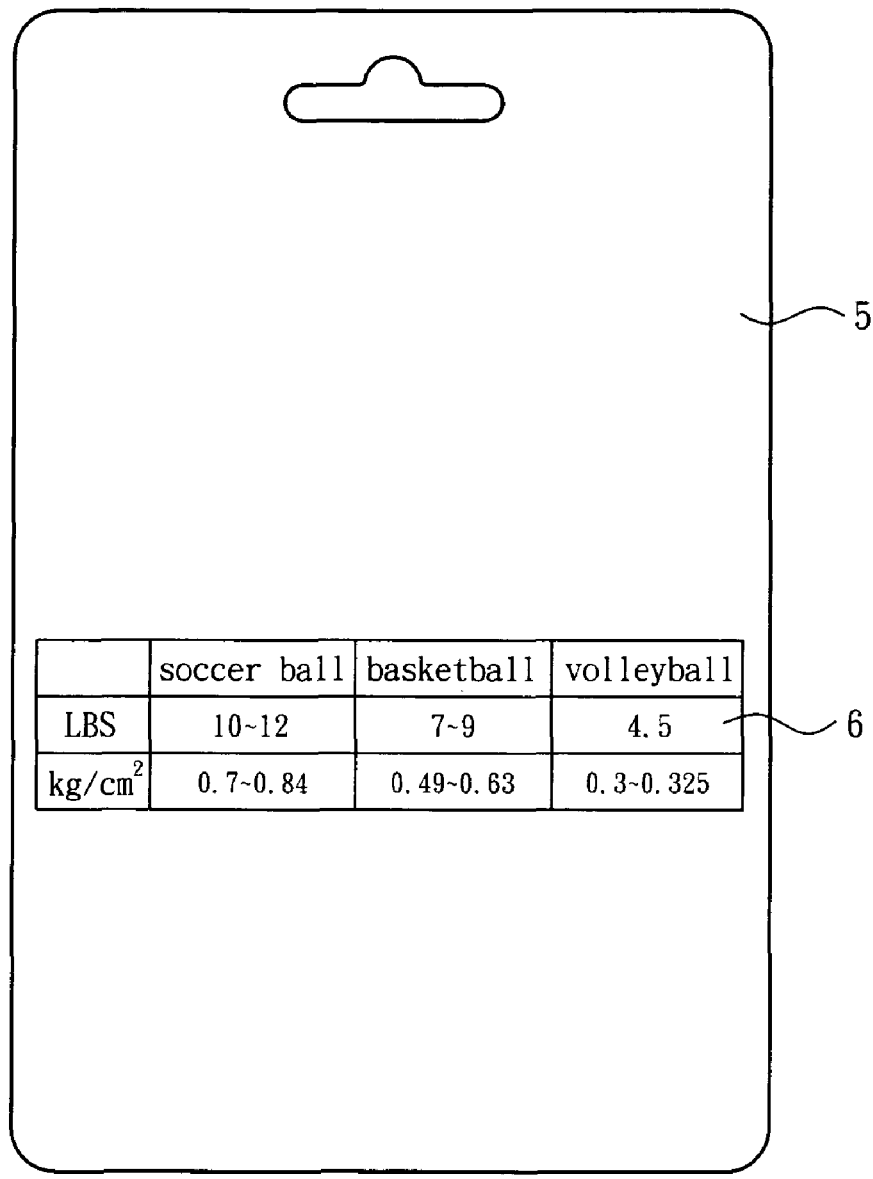
FIG. 2 shows a hangtag for a conventional ball pressure gauge showing applicable pressure ranges for various balls.
Figure 3:
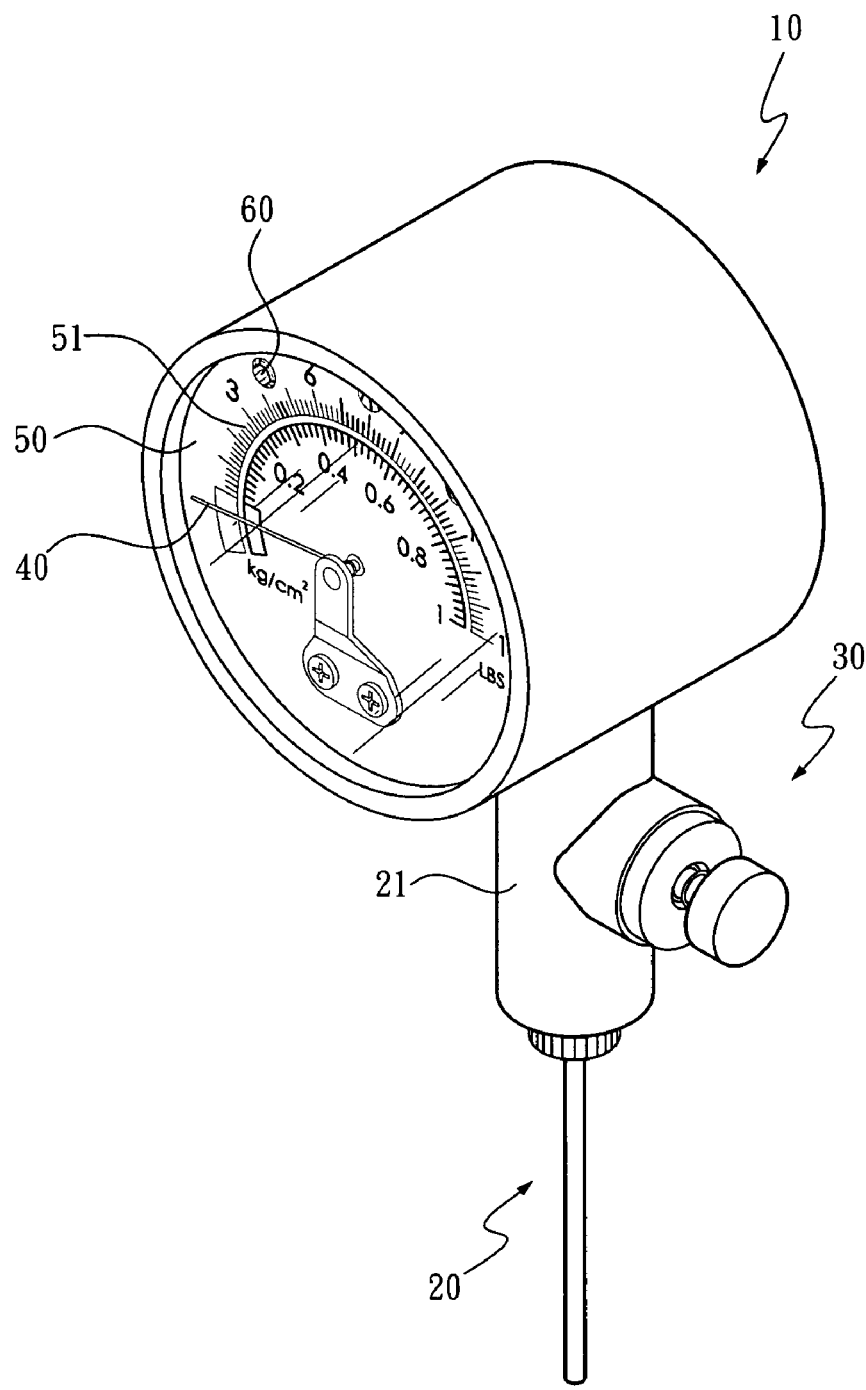
FIG. 3 is a perspective view of a ball pressure gauge of the present invention.
Figure 4:
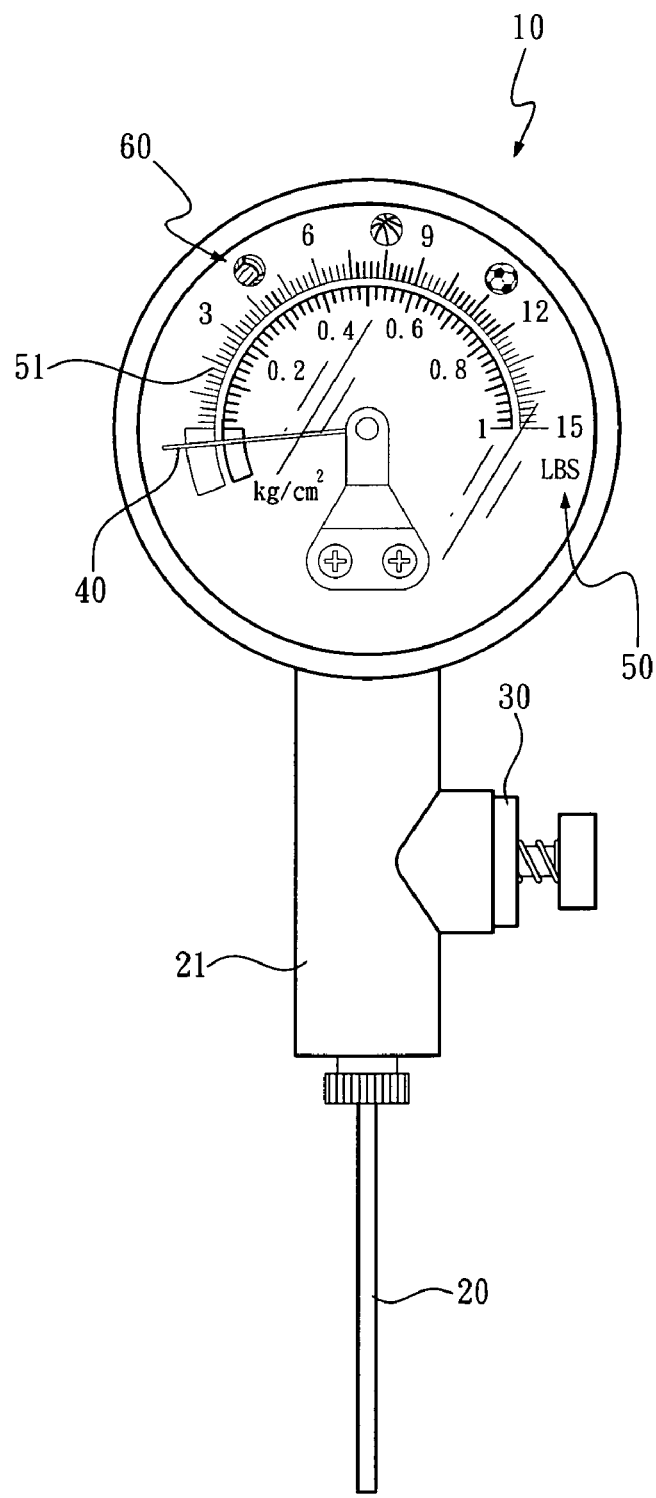
FIG. 4 is a front view of the ball pressure gauge of the present invention.

Referring to FIG. 3 and FIG. 4, the present invention provides a ball pressure gauge 10 primarily comprises a probe 20, a pressure-resealing valve 30, an air-pressure indicator 40 and at least one ball-specific recommended pressure dial 60.

The probe 20 is configured to pierce into an air valve of a ball 90 whose inner air pressure is to be measured by the ball pressure gauge 10. The ball pressure gauge 10 removable receives the probe 20 with a probe adapter 21.

The pressure-resealing valve 30 communicates with the probe 20 to allow or disallow air communication between the interior of the probe 20 and the ambient atmosphere.

The air-pressure indicator 40 is a hand moving according to magnitude of an air pressure measured from the ball.

The gauge body 50 is provided with a set of air-pressure scale 51 for the air-pressure indicator 40 to point and indicate the magnitude of the air pressure 90 by the ball pressure gauge 10 as a numeral value.

The ball-specific recommended pressure dial 60 is set alongside the air-pressure scale 51 and includes segments representing ranges of applicable air pressures for different types of balls. The ball-specific recommended pressure dial 60 may include various icons of balls, words and/or symbols located in the gauge body 50 corresponding to respective ranges alongside the air-pressure scale 51 for showing applicability of different air-pressure ranges.

With the configuration described able, the present invention functions in the manner given below.

For the sake of clear explanation, the ball-specific recommended pressure dial 60, when referred, is characterized by plural icons of balls.

Referring to FIG. 4, ranges of applicable air pressures for volleyballs, basketballs and soccer balls are provide in the ball-specific recommended pressure dial 60. Therein, the range of 0.3~0.325 Kg/cm$^2$ (about 4.5 lbs) is recommended for a volleyball, and the range of 0.49~0.63 Kg/cm$^2$ (about 7~9 lbs) is recommended for a basketball, while the range of 0.7~0.84 Kg/cm$^2$ (about 10~12 lbs) is recommended for a soccer ball. Therefore, along the ball-specific recommended pressure dial 60, icons representing respectively a volleyball, a basketball and a soccer ball are set corresponding to the foregoing ranges in the air-pressure scale 51.

Figure 5:
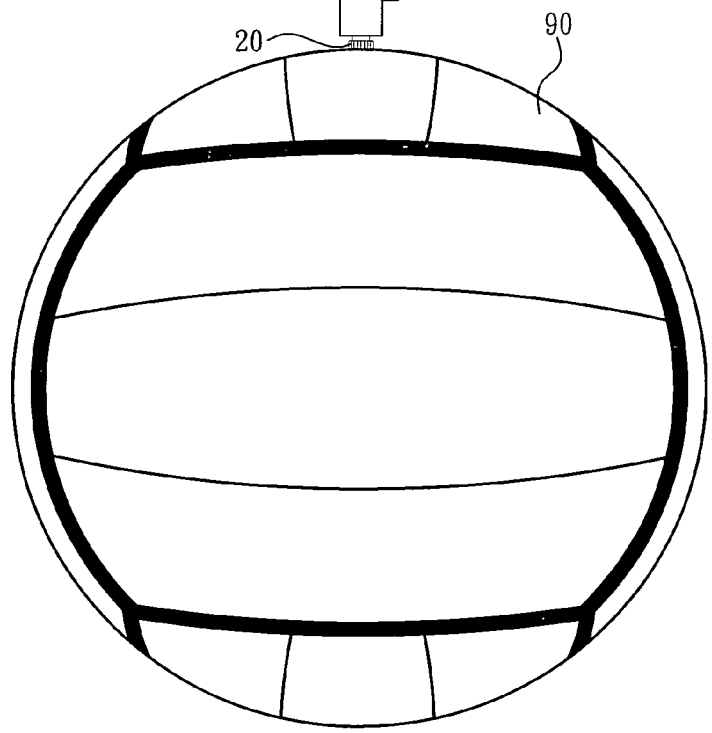
FIG. 5 is an applied view of the ball pressure gauge of the present invention.
Figure 8:
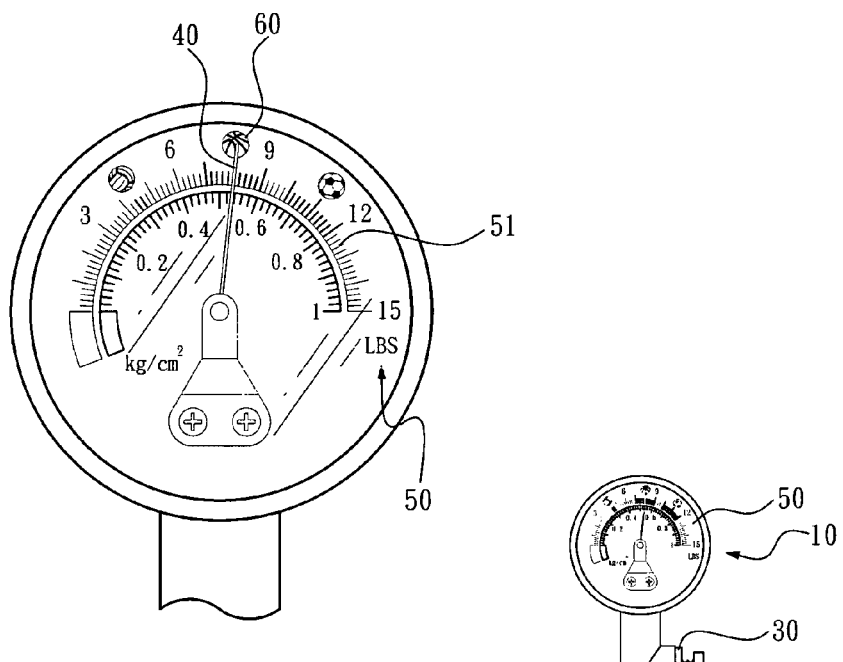
FIG. 8 is a partially enlarged view of the gauge body of the ball pressure gauge of FIG. 7.
Figure 7:
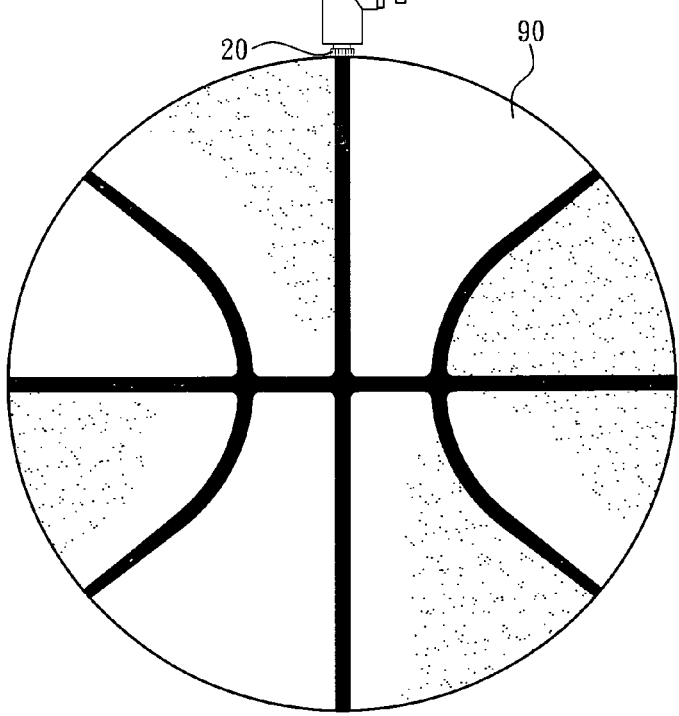
FIG. 7 is another applied view of the ball pressure gauge of the present invention.
Figure 10:
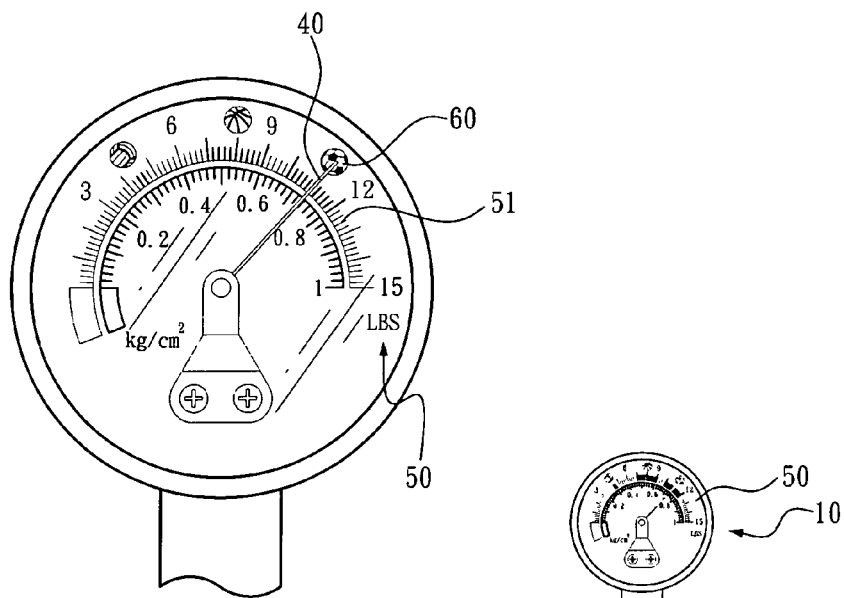
FIG. 10 is a partially enlarged view of the gauge body of the ball pressure gauge of FIG. 9.
Figure 9:
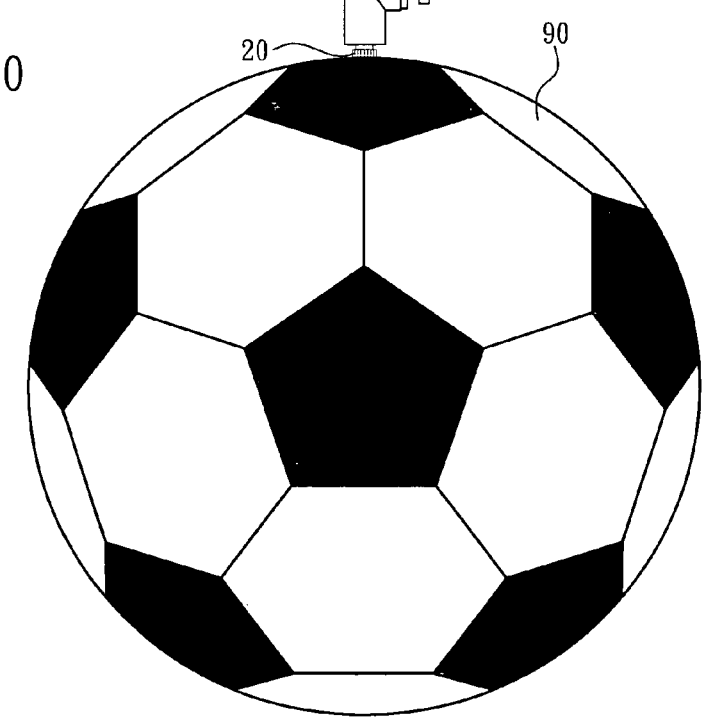
FIG. 9 is still another applied view of the ball pressure gauge of the present invention.

Referring to FIG. 5, when it is intended to use the disclosed ball pressure gauge for a volleyball, the ball 90 to be measured, i.e. the volleyball, is first inflated by using a proper inflator, and then the probe 20 of the ball pressure gauge 10 is inserted into the ball 90 to be measured through an air valve of the ball. The air pressure inside the ball 90 is at this time communicated to the ball pressure gauge 10 through the probe 20 so that the ball pressure gauge 10 is able to indicate the measured pressure by means of the air-pressure indicator 40 in the gauge body 50.

Figure 6:
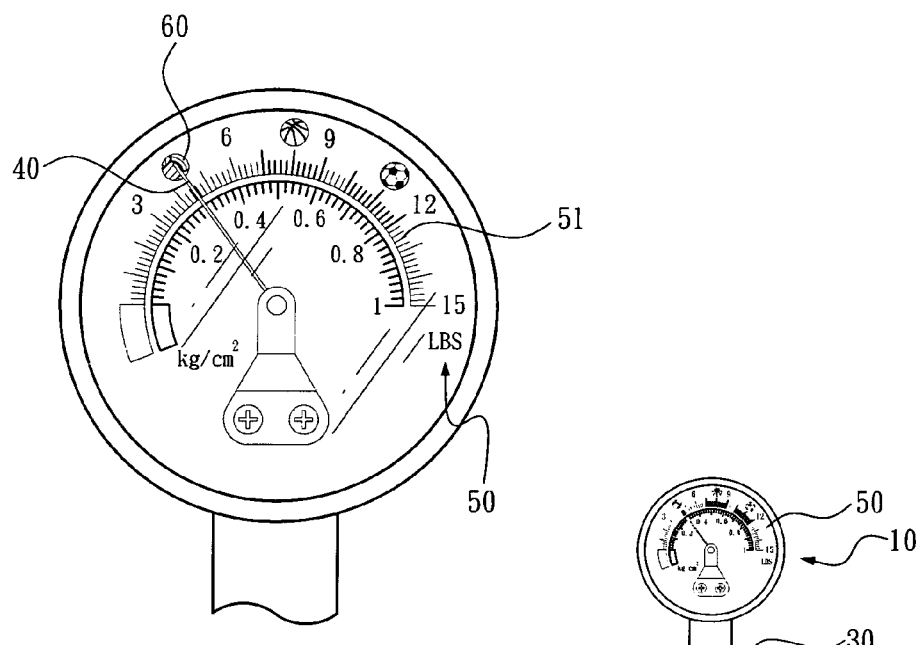
FIG. 6 is a partially enlarged view of a gauge body of the ball pressure gauge of FIG. 5.

Referring to FIG. 6, in virtue of the ball-specific recommended pressure dial 60, a user reading the reading pointed by the air-pressure indicator 40 can at the same time be informed of whether the air pressure inside the ball 90 is appropriate for the particular ball. If the measured air pressure inside the ball 90 is lower than the recommended range for that ball, inflation can be conducted again to raise the air pressure inside the ball 90. If the air pressure inside the ball 90 is greater than the recommended range, the pressure-resealing valve 30 can be operated to allow the air inside the ball 90 to communicate with the external, ambient atmosphere through the probe 20, thereby releasing some air to reduce the air pressure inside the ball 90. Then, when the air-pressure indicator 40 points the air pressure as one applicable to the ball, the pressure-resealing valve 30 can be closed, so the adjustment of air pressure inside the ball 90 is completed.

Similarly, referring to FIG. 7 through FIG. 10, when the present invention is used for a basketball and a soccer ball, the user can easily inflate the balls properly by following the indication of the ball-specific recommended pressure dial 60.

In virtue of the ball-specific recommended pressure dial 60 alongside the air-pressure scale 51 in the gauge body 50, the ball pressure gauge 10 of the present invention can rapidly and directly inform a user of ball-specific appropriateness of the measured air pressure, so that the user can instantly adjust the air pressure for ball-specific appropriateness. Thereby, the present invention is more advantageous than the conventional ball pressure gauges that only indicate air pressures by a scale like the air-pressure scale 51 and require their users to memory the applicable pressure ranges for different balls in mind. With the unique ball-specific recommended pressure dial 60 of the present invention, users no more need to carefully keep packaging materials or hangtags coming along with a new ball pressure gauge that state ball-specific applicable air pressure ranges and tend to be lost after the user unpacks the ball pressure gauge.

Furthermore, since the present invention includes the pressure-resealing valve 30, when the measured air pressure inside the ball 90 is greater than the recommended range, the pressure-resealing valve 30 can be directly operated to release air for the ball pressure gauge 10 to immediately again confirm the appropriateness of the current pressure magnitude, thereby rapidly completing air pressure adjustment for the ball 90.

Moreover, the air-pressure scale 51 may be segmented and colored differently for different recommended pressure ranges. For example, the air-pressure scale 51 has its segment corresponding to the range of 0.3~0.325 Kg/cm$^2$ (about 4.5 lbs) that is applicable to a volleyball, may be highlighted by, for example, red or may be made bold-faced, so as to be read in conjunction with the ball-specific recommended pressure dial 60 for informing the user of the appropriateness of the current air pressure in the ball 90 better.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A ball pressure gauge for measuring magnitude of an air pressure in an inflatable ball, the ball pressure gauge primarily comprising:
   a probe being configured to pierce into the ball;
   an air-pressure indicator being configured to move according to the magnitude of the air pressure;
   a gauge body being provided with a set of air-pressure scale for the air-pressure indicator to point and indicate the magnitude of the air pressure as a numeral value; and
   at least one ball-specific recommended pressure dial being set alongside the air-pressure scale and including segments representing ranges of applicable air pressures for different types of balls.

2. The ball pressure gauge of claim 1, wherein the ball-specific recommended pressure dial includes icons of the different types of balls located in different said segments, respectively.

3. The ball pressure gauge of claim 1, wherein the ball-specific recommended pressure dial includes words representing the different types of balls and located in different said segments, respectively.

4. The ball pressure gauge of claim 1, wherein the ball-specific recommended pressure dial includes symbols representing the different types of balls and located in different said segments, respectively.

5. The ball pressure gauge of claim 1, wherein the air-pressure scale is segmented and colored differently for different pressure ranges applicable to the different types of balls.

6. The ball pressure gauge of claim 1, further comprising a pressure-resealing valve communicating with the probe.

* * * * *